Feb. 21, 1933.     W. S. BAYLIS ET AL     1,898,165
PROCESS OF DECOLORIZING OILS WITH ACID ACTIVATED EARTH AND WATER
Filed May 14, 1929
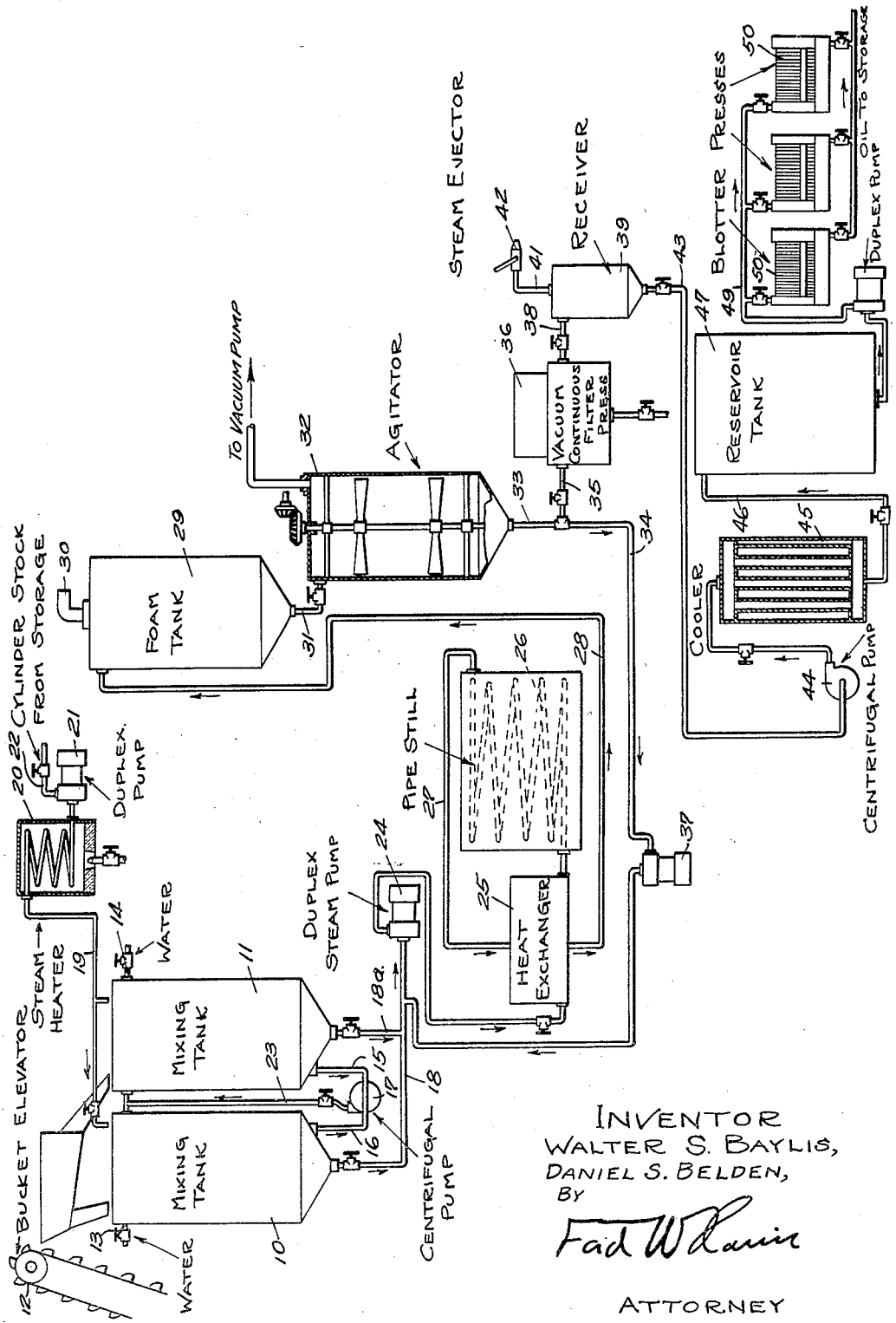
INVENTOR
WALTER S. BAYLIS,
DANIEL S. BELDEN,
BY
ATTORNEY Patented Feb. 21, 1933

1,898,165

UNITED STATES PATENT OFFICE

WALTER S. BAYLIS AND DANIEL S. BELDEN, OF LOS ANGELES, CALIFORNIA, ASSIGNORS TO FILTROL COMPANY OF CALIFORNIA, OF LOS ANGELES, CALIFORNIA, A CORPORATION OF CALIFORNIA

PROCESS OF DECOLORIZING OILS WITH ACID-ACTIVATED EARTH AND WATER

Application filed May 14, 1929. Serial No. 363,050.

This invention relates to a process and an adsorbent mass suitable for decolorizing mineral oils, particularly such lubricating stocks as have first received treatment with sulfuric acid. Such oils are practically always too acid to be used directly as lubricants and usually require further decolorization as well as neutralization.

This application is a continuation in part of the co-pending application, Serial No. 262,501, filed March 17, 1928 by Walter S. Baylis.

It is the object of this invention to provide a new and more efficient adsorbent for treating such oils and a particularly efficient process for using this adsorbent on acid oils and upon oils in general, including neutral mineral oils and those of animal and vegetable origin.

Among the advantages flowing from our invention are:

(1) The provision of a stable oil admixed adsorbent carrying water.

(2) The ready dispersibility in oil of such an adsorbent.

(3) The more efficient decolorizing action of such an adsorbent, or the shorter time necessary to obtain equivalent bleaches with it.

(4) The efficient neutralizing action of the adsorbent upon the oil in the process.

(5) The final elimination of the water from the oil and adsorbent at the end of the decolorizing process without the necessity of special heating.

(6) The leaving of the oil after treatment in neutral condition.

The present adsorbent and process are improvements on the Prutzman mud process as disclosed in U. S. Patents Nos. 1,471,201; 1,562,001; and 1,599,715 to P. W. Prutzman, et al.

In one form of our invention we make an oil and water mixture of the powdered adsorbent with from 1½ to 3 times its weight of water and 5 to 20 times its weight of oil. We prefer to use adsorbents of the acid-activated clay type of which the product of U. S. Patent No. 1,397,113 to P. W. Prutzman and the commercial product known as "Filtrol" are the best examples. "Filtrol" is prepared by a process somewhat similar to the Prutzman product, that is, by activating a smectite or bentonite clay by heating with dilute sulfuric acid and then washing with water. We prefer that these products shall be in a finely pulverized condition before mixing.

In order to make the mixture according to the first described process, we place the powdered adsorbent in a tank or pair of tanks provided with an outer centrifugal pump circuit. We add oil and water simultaneously in separate streams to the dry adsorbent. If the tank is also provided with a paddle agitator, we prefer to operate this gently also.

Paddle agitation may be used in p!ace of centrifugal pump agitation, but we prefer to mix the oil, adsorbent and water together by operating the centrifugal pump during the addition of the liquid components to the powder. The pump should not be run at such a high speed as to emulsify the oil and water. More solid adsorbent may be added at any time during the mud mixing operation.

After the oil, water and adsorbent are mixed together, the adsorbent exerts a powerful absorbing action upon the water and withdraws the latter into its pores to a great extent. In consequence, the oil phase of the mixture becomes the enveloping one and entirely encloses the particles of wet clay. Whether the latter sink or remain suspended is of no consequence; they are now easily dispersib'e in the main body of oil. That is what is desired, and the prepared adsorbent may be so added to either hot or cold oil.

The temperatures at which the mixing process is accomplished need not be high. Generally room temperature will be found sufficient. In the use of viscous oils for mixing, it may be desirable to reduce this viscosity somewhat by increasing the temperature. Only as high a temperature as 125° F. shpuld be used, since it is not desired to create any emulsion or reverse any phases as is done in Prutzman Patent No. 1,599,715 nor to eliminate any appreciable quantity of the water from the mixture until decolorization of the main body of oil takes place.

In another form of the invention, we may prepare the adsorbent directly in the main body of the oil to be decolorized. In doing so, we first wet the clay, "Filtrol", with 1½ to 3 times its weight of water, mix thoroughly and then place the resulting mass directly in the main body of the oil to be decolorized and keep it there until the water is entirely absorbed into the pores of the clay. It is not until such absorption has occurred that the agitation of the clay with the oil is begun. A considerable period of time, say one hour or more, of rest is contemplated in the process, to allow absorption of water, and then only is the real operation of decolorization commenced by starting the agitator or the pump. It is immaterial in the case of light oils whether the oil is warm during the period of rest or not. In the case of heavy oils, however, we prefer to keep them at 100° F. at least, but not over the boiling point of water.

Sometimes an oil is encountered that is not sufficiently acid to enable the "Filtrol" or other adsorbent to do its best work. This is especially true of oils which have not been given a preliminary acid treatment. A proper acidity may be conferred upon such oils in the practice of my process in either of two ways:

1. Direct addition of acid to the main body of the oil.
2. Addition of acid to the mixed and oiled adsorbent intended to be added to the main body of the oil.

In the first of these methods, concentrated sulfuric acid to any amount up to and including 1% of the total weight of the main body of oil may be added to the latter.

In the second method concentrated sulfuric acid to the amount of 15% may be mixed with the first wetted clay, and then the clay is admixed with from 3 to 20 times its dry weight of oil. The first method is preferred for use with the more reactive oils since there is no danger of forming an immiscible sludge with the oil. If the concentration of the acid be reduced by dilution to below sludge forming concentration, a correspondingly larger amount of the diluted acid may be used in making the mixed adsorbent. In this way, reactive oils may be treated by the second method without damage.

The accompanying drawing illustrates more or less diagrammatically an apparatus adapted to the manufacture and application upon oils of our improved adsorbent. The view shown is a side elevation. It is to be understood that the apparatus shown is not necessary to the carrying out of either our decolorizing process or the manufacture of our adsorbent.

In the drawing, that part of the apparatus indicated by numerals 10 to 23 inclusive is used in the preparation of the oil-admixed adsorbent, and also to mix the product so prepared with the main body of the oil.

Numerals 10 and 11 indicate a pair of deep vats or tanks, to which a powdered decolorizing agent may be delivered by a bucket conveyor 12. Pipes 13 and 14 deliver water to each respective tank, while a pipe 19 is the source of oil supply. The oil is taken from storage through a pipe 22 by a duplex pump 21, heated in a heater 20 and delivered to the tanks through the pipe 19.

The tanks 10 and 11 are provided with an external pipe circuit comprising pipes 15, 16, 23, and a centrifugal pump 17. The pump is preferably of a type that may be run in either direction. The components of the mixed adsorbent may then be drawn from the bottom of either tank 10 or 11, mixed in the pump 17 and delivered to the tops of either tank through a pipe 23.

Pipes 18 and 18a with a duplex pump 24 serve to deliver the oil and wet clay mixture to a heating coil or "pipe still" 26 through a heat exchanger 25.

The pipe still 26 is of the ordinary commercial type and is directly heated by a flame within a refractory housing. The oil passing through the still makes its exit through a pipe 27, which leads back to the heat exchanger 25, from whence a pipe 28 delivers the partially cooled oil to a foam tank 29.

The foam tank is a large vessel provided with a steam vent 30, the purpose of which is to allow the escape of moisture from the hot oil. A considerable amount of foam is generated in this escape, so that the reason for the name "foam tank" is evident. A bottom discharge pipe 31 is also provided, from which oil-adsorbent mixture may be delivered to an agitator tank 32, of approximately equal size.

The tank 32 also has a bottom discharge 33, which joins with both a return pipe 34 and with a pipe 35 communicating with the basin of a vacuum continuous filter 36, preferably of the Oliver type. The purpose of the return pipe 34 and of a duplex pump 37 therein is to allow a recirculation of oil and adsorbent back to a point just before the duplex pump 24, so that the mixture may be reheated in the pipe still until it is brought to a sufficiently high temperature.

The filtered oil from the filter 36 will flow through a pipe 38 into a receiver 39, while the spent adsorbent will be discharged through an outlet 40, from whence it will go by conveyor to a suitable extracting and reactivating apparatus, not shown. The receiver 39 and the associated filter are able to be held continuously under partial pressure by reason of the connection thereto by means of a pipe 41 of a steam ejector 42.

The receiver 39 may be emptied from its bottom through a pipe 43 and a centrifugal pump 44. A cooler 45 is provided to cool the oil before it flows into a reservoir tank 47 through a pipe 46. A duplex pump 48 is provided to take oil from the bottom of the tank 47 and force it through a pipe 49 and through blotter presses 50—50—50 from whence it flows to storage.

When using the apparatus illustrated, the process is carried out as follows:

The bucket conveyor 12 is operated to deliver powdered clay adsorbent to the tanks 10 and 11 and at the same time water is run into both tanks from the pipes 13 and 14, while cool oil is also delivered through the pipe 19. The heater 20 is temporarily turned off so that the oil shall not be heated. As soon as enough liquid is present in the tanks 10 and 11 so that the mixture formed can be pumped, the centrifugal pump 17 is started and the mixture pumped from the lower parts of the tanks 10 and 11, through the pipes 16 and 23, to the tops of said tanks. The ratio of the components of the mixture pumped is preferably, by weight, 1 clay; 2 water; 10 oil. It is not necessary that the proportions be exact; they may be varied to suit the requirements of various oils and clays. Softened water is preferably used.

After a period of circulation through the pump, which may range from 5 to 50 minutes, and last preferably about 20 minutes, the pump is stopped and the resulting slurry is allowed to stand. The standing period may be as short as 30 minutes and may be as long as two or three days; in fact, the mixture may be allowed to stand indefinitely if evaporation of water is prevented by storing the mixture in a closed tank. The manufacture of the mudded adsorbent is completed after standing, the test of completeness being whether any water is left unabsorbed. If it is, the reaction is not complete and additional agitation or standing may be necessary.

The next step in the process is the use of the mudded adsorbent in the contact filtration of the main body of oil.

The main body of oil to be decolorized is now pumped from the pipe 22 by the pump 21 through the heater 20, into which the steam has now been turned, so as to heat the oil by indirect heat. The oil then flows through the pipe 19 into the tanks 10 and 11. When one or both tanks 10 and 11 are full of the oil to be decolorized and the adsorbent mixture therefor, the pump 21 is stopped and the pump 17 started. Agitation of the oil with the oily and wet clay adsorbent will then be accomplished as before, with the additional effect of dispersing the particles of such adsorbent immediately through the large body of oil. The suspension of wet clay in oil is now ready to be more highly heated to temperatures at which decolorization takes place. The pump 17 is stopped and the pump 24 started for the purpose of pumping the mixture through the pipe still 26 and the burner of the latter is lighted.

It will take an appreciable time before the oil passing through the pipe still will be heated hot enough for efficient decolorization to take place. The three pieces of apparatus in which this action occurs are the pipe still 26, the foam tank 29 and the agitator 32. Provision is therefore made, as has been before explained, for returning the oil, which is pumped from the pipe still to the foam tank 29 and which flows from thence to the agitator tank 32, back to the pipe still for reheating. The means referred to is the pipe 34 and the pump 37. The oil mixture which leaves the pipe still, the foam tank and the agitator tank is recirculated therefore until it has reached a temperature varying from 250° F. to 750° F. depending upon the kind of oil under treatment. The more viscous oils will require the higher temperatures.

For some oils, especially those which are intended to be of very light color and are made from stocks susceptible to oxidation, double contacting may be practiced. The second contacting may take place at a considerably lower temperature, say, 200° to 250° F. lower than the first and may be of much longer duration than the first. Additional sulfuric acid or additional Filtrol or other acid-activated clay may be added at the start of the second contacting. Such additional charge of clay may be mixed with water and oil as was the original charge.

In the foam tank the hot oil and adsorbent mixture rids itself of the water which it held in the pores of the clay. A temperature well above the boiling point of water is necessary for this elimination, but such temperatures are easily obtained by the use of the pipe still and are contemplated in the process. During operation of the foam tank, the rate of outflow of the oil is intended to be nearly that of the inflow, so that the tank will be from ½ to ⅔ full while operating.

The agitating tank is intended to be the locus of the finishing of the decolorizing process and to operate in the same manner as the foam tank with respect to conditions of outflow and inflow. The agitator is kept in continuous operation and the rate of outflow is so adjusted that the output will be as completely decolorized as is commercially desirable. For this reason it is essential that the tank have its outlet and inlet on the opposite ends. It may be operated by the batch system.

The outflow of the tank 32 is fed, preferably continuously to the Oliver vacuum type filter 36, which needs no further description. The cake scraped from the drum of this filter is dropped continuously through the outlet 40 upon a conveyor and sent to an extracting and reactivating plant, not shown. The liquid output of the filter flows continuously into the receiver 39, the filter and receiver being held under vacuum by the continuous operation of the steam ejector 42.

The centrifugal pump 44 withdraws oil from the bottom of the receiver 39 and transfers it through the cooler 45, of any conventional commercial type, to the reservoir tank 47. Beyond this tank a duplex pump 48 transfers the oil to a series of blotter presses 50—50—50 of the conventional type by means of which the last traces of solid matter are removed from the oil, which is then sent to storage.

It is to be understood that all necessary and convenient valves may be placed on the above described apparatus at appropriate places.

The process is not limited to the treatment of sour oils, but may also be used on neutral oils, the latter being of either animal, vegetable or mineral origin.

We claim as our invention:

1. A process of decolorizing oils which consists in wetting clay with water, adding said mixture of clay and water to the oil to be decolorized, allowing the entire mass to stand at rest until all of the water is practically absorbed into the pores of the clay, heating the mass to a temperature between and including 250° F. and 750° F., adding additional clay, heating the mixture to a temperature below that of the first heat treatment, and then agitating the mixture until the decolorization of the oil is complete.

2. A process of decolorizing oils which comprises making a mixture of clay, water, and oil, adding acid and said mixture to the oil to be decolorized, heating said mixture to a temperature between and including 250° F. and 750° F., allowing the water to discharge itself from said mixture, adding additional clay, heating said mixture to a temperature below that of the first heat treatment, agitating the mixture, and separating the clay from the oil.

In testimony whereof, the said WALTER S. BAYLIS has hereunto set his hand at New York, N. Y., this 13th day of May, 1929, and the said DANIEL S. BELDEN has hereunto set his hand at Los Angeles, California, this 29th day of April, 1929.

WALTER S. BAYLIS.
DANIEL S. BELDEN.